US006467082B1

(12) United States Patent
D'Arcy et al.

(10) Patent No.: US 6,467,082 B1
(45) Date of Patent: Oct. 15, 2002

(54) METHODS AND APPARATUS FOR SIMULATING EXTERNAL LINKAGE POINTS AND CONTROL TRANSFERS IN SOURCE TRANSLATION SYSTEMS

(75) Inventors: Paul Gerard D'Arcy, Alpharetta, GA (US); Pamela C. Deschler; Sanjay Jinturkar, both of Bethlehem, PA (US); Kamesh Peri; Ramesh V. Peri, both of Allentown, PA (US); David B. Whalley, Tallahassee, FL (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/203,842

(22) Filed: Dec. 2, 1998

(51) Int. Cl.⁷ .................................................. G06F 9/44
(52) U.S. Cl. ........................ 717/127; 717/136; 717/163
(58) Field of Search ............................ 717/7, 127, 136, 717/163; 714/1

(56) References Cited

U.S. PATENT DOCUMENTS

| | | | | |
|---|---|---|---|---|
| 5,129,064 A | * | 7/1992 | Fogg, Jr. et al. ............ | 395/500 |
| 5,167,023 A | * | 11/1992 | Nicolas et al. ................. | 717/7 |
| 5,274,811 A | * | 12/1993 | Borg et al. .................. | 717/100 |
| 5,301,325 A | * | 4/1994 | Benson ........................ | 395/707 |
| 5,339,238 A | * | 8/1994 | Benson ........................ | 395/707 |
| 5,450,575 A | * | 9/1995 | Sites ............................ | 395/707 |
| 5,598,560 A | * | 1/1997 | Benson ........................ | 395/707 |
| 5,797,014 A | * | 8/1998 | Gheith ......................... | 717/162 |
| 5,842,017 A | * | 11/1998 | Hookway et al. ............ | 395/707 |
| 5,911,059 A | * | 6/1999 | Profit, Jr. ................ | 395/500.44 |
| 5,958,061 A | * | 9/1999 | Kelly et al. ...................... | 714/1 |
| 5,966,537 A | * | 10/1999 | Ravichandran ............. | 395/709 |
| 5,999,734 A | * | 12/1999 | Willis et al. ................ | 395/706 |
| 6,006,022 A | * | 12/1999 | Rhim et al. ............ | 395/500.02 |
| 6,031,992 A | * | 2/2000 | Cmelik et al. .............. | 395/705 |
| 6,110,226 A | * | 8/2000 | Bothner ......................... | 717/7 |

OTHER PUBLICATIONS

B. Cmelik et al., "Shade: A Fast Instruction–Set Simulator for Execution Profiling," ACM Sigmetrics Conference on Measurement and Modeling of Computer Systems, 1994.

V. Zivojnovic et al., "Compiled Simulation of Programmable DSP Architectures," IEEE Workshop on VLSI Signal Processing, pp. 187–196, 1995.

K. Ebcioglu et al., "DAISY: Dynamic Compilation for 100% Architectural Compatibility," IBM Research Report RC 20538, pp. 1–13, 1996.

* cited by examiner

Primary Examiner—Kakali Chaki
Assistant Examiner—Todd Ingberg
(74) Attorney, Agent, or Firm—Ryan, Mason & Lewis, LLP (57) ABSTRACT

A method for simulating a first processor (e.g., target processor) on a second processor (e.g., host processor) includes translating assembly language instructions associated with the first processor into 'C' language code. The 'C' language code is then compiled by a compiler program running on the second processor. The compiled code is then executed by the second processor to simulate the first processor. For example, the code may be checked to determine whether it is functionally correct and/or run-time statistics may be collected regarding the program associated with the first processor.

40 Claims, 12 Drawing Sheets

CMP r1, r2
BGT loop

FIG. 3A if (r1 < r2) psw = psw | 0x0008;
else if (r1 > r2) psw = psw | 0x0004;
else psw = psw | 0x0002;
if (psw & 0x0004) goto loop;

FIG. 3B if (r1 < r2) psw = psw | 0x0008;
else if (r1 > r2) {
    psw = psw | 0x0004;
    goto loop;
} else psw = psw | 0x0002;

```
main()
{
        init();
        while (not_stopped)
                code_fn_ptr();
}
```

FIG. 5

```
            .export l1
            .import l3
l1:         ld r0, 1
            call l3
            goto l2
            ld r3, r5
l2:         st r3, foo
            return
```

FIG. 6A

```
extern void l3();

void l1()
{
        code_fn_ptr = file1_code;
        pc = 1000;
} file1_code()
{
        while (1)
        {
                switch (pc)
                {
                /* code at label l1 */
                case 1000:
                        /* code for ld r0, 1 */
                        pc = 1001;
                        break;
                case 1001:
                        /* code for call l3 */
                        l3();
                        return;
                case 1002:
                        pc = 1004;
                        break;
                case 1003:
                        /* code for ld r3, r5 */
                        pc = 1004;
                        break;
                /* code at label l2 */
                case 1004:
                        /* code for st r3, foo */
                        pc = 1005;
                        break;
                case 1005:
                        pc = return_address_reg;
                        code_fn_ptr = <from return_fn_addr location>;
                        return;
                default:
                        /* generate error message */
                }
        }
}
```

FIG.6B

METHODS AND APPARATUS FOR SIMULATING EXTERNAL LINKAGE POINTS AND CONTROL TRANSFERS IN SOURCE TRANSLATION SYSTEMS

FIELD OF THE INVENTION

The invention relates to methods and apparatus for simulation of microprocessors and, more particularly, to methods and apparatus for such simulation employing translation of an assembly language target program into a high level language program, such as a 'C' language program, for execution by a host processor.

BACKGROUND OF THE INVENTION

Instruction level simulation of processors is useful for a variety of purposes such as, for example: (i) estimating the performance of a processor during a development stage; (ii) developing and testing applications for processors even before actual hardware is available; and (iii) developing and testing applications for embedded processors which have very minimal support for I/O (input/output).

Digital signal processors (DSPs) are embedded processors which have very stringent time-to-market requirements. As a result, instruction level simulators are needed for timely development of highly efficient applications. Moreover, the complexity of programs being executed by modern DSPs has increased tremendously in recent years. Therefore, high speed instruction level simulators for such DSPs, which provide detailed information about the program being executed, are needed.

It is to be appreciated that, hereinafter, the following terminology will be used: a processor to be simulated is referred to as the target processor or target machine; a program to be run on a target processor is referred to as a target program; a processor on which a simulator is to run is referred to as a host processor or host machine; and a program to be run on a host processor is referred to as a host program.

The instruction level simulators that are available today typically execute about one hundred thousand instructions per second on a 200 MHZ processor. That is, the simulators are 2000 times (200 MHZ/100,000) slower than the speed of the processor. As a result, the simulators take 2000 cycles (which translates into approximately 2000 instructions on a RISC host processor) on the host processor to simulate every instruction of the target processor.

Conventional instruction level simulators may typically be categorized as one of three types: (i) instruction interpreters; (ii) static compilers; and (iii) dynamic compilers.

(i) Instruction interpreters are simulators which take one instruction at a time and execute the instruction according to defined semantics. Such simulators tend to be very slow.

(ii) Static compilers take a user program written in the target assembly language of the processor being simulated and convert it into an equivalent machine level program on the host machine's processor. This approach yields very fast code running anywhere from −10 to +10 factor speedup depending on the complexity of the processor being simulated. However, there are several disadvantages to this approach. For example, static compilers can not make use of tools, such as debuggers, on the host machine since these tools can have information about the source assembly language and not the target assembly language. Usually, special debuggers must be developed to work with these simulators. Further, considerable work must be done to optimize code that is produced by the compiler on the host machine. This is because none of the existing simulators perform any significant optimization. In fact, this technique cannot make use of the optimization techniques already present in the native compilers on the host machine. Still further, static compilers are very difficult to re-target since the technique they employ is inherently tied into the assembly languages of the target and host processors, which may significantly differ from one another.

(iii) Dynamic compilers are hybrids between the instruction interpreters and the static compilers. In this approach, the target instructions are translated at runtime into the host machine instructions and whenever the target machine instruction needs to be executed. Dynamic compilers have some advantages over the previous two approaches. For instance, dynamic compilers are relatively fast since translation typically only occurs once. Also, self modifying code can be handled by incorporating facilities into the run-time code generator to check whether the code space is ever written and invalidating the translation if that is indeed the case.

However, the above approaches suffer from certain common disadvantages. For example, none of the above three approaches can use the native tools on the host machine, such as debuggers or profilers, for program development on the target processor. In fact, these existing simulators come with their own special tools, such as debuggers and profilers, but which are developed at great expense and are typically unfamiliar to developers.

Also, the code that is produced by the translators used in the above approaches is usually un-optimized due to the inherent limitations of the techniques employed. In fact, the dynamic compilers and interpreters can not perform any significant optimization since they are not exposed to a big enough window of the code to make the optimizations possible. Even in the case of some possible optimizations, the overhead associated with performing them at run-time is typically too high. On the other hand, the static compilation approach usually does not do any optimization since the analysis needed for applying the optimization is fairly difficult to perform at the machine level, e.g., registers are already allocated.

Further, there has been a large amount of research and development performed in the area of compilers with respect to optimizations available on host machines, however, for the reasons given above, none of the above three techniques make any significant use of such results to speed up simulations.

Still further, it is very difficult to re-target any of the above techniques to a different host machine. That is, if there is a need for a simulator for a target processor on more than one host machine, then different simulators need to be written in the static and dynamic compilers approaches since they are inherently tied to the machine language of the host machine. This is referred to as the "m×n" problem, that is, "m×n" simulators need to be generated for "m" target processors on host processors.

Figure 1:
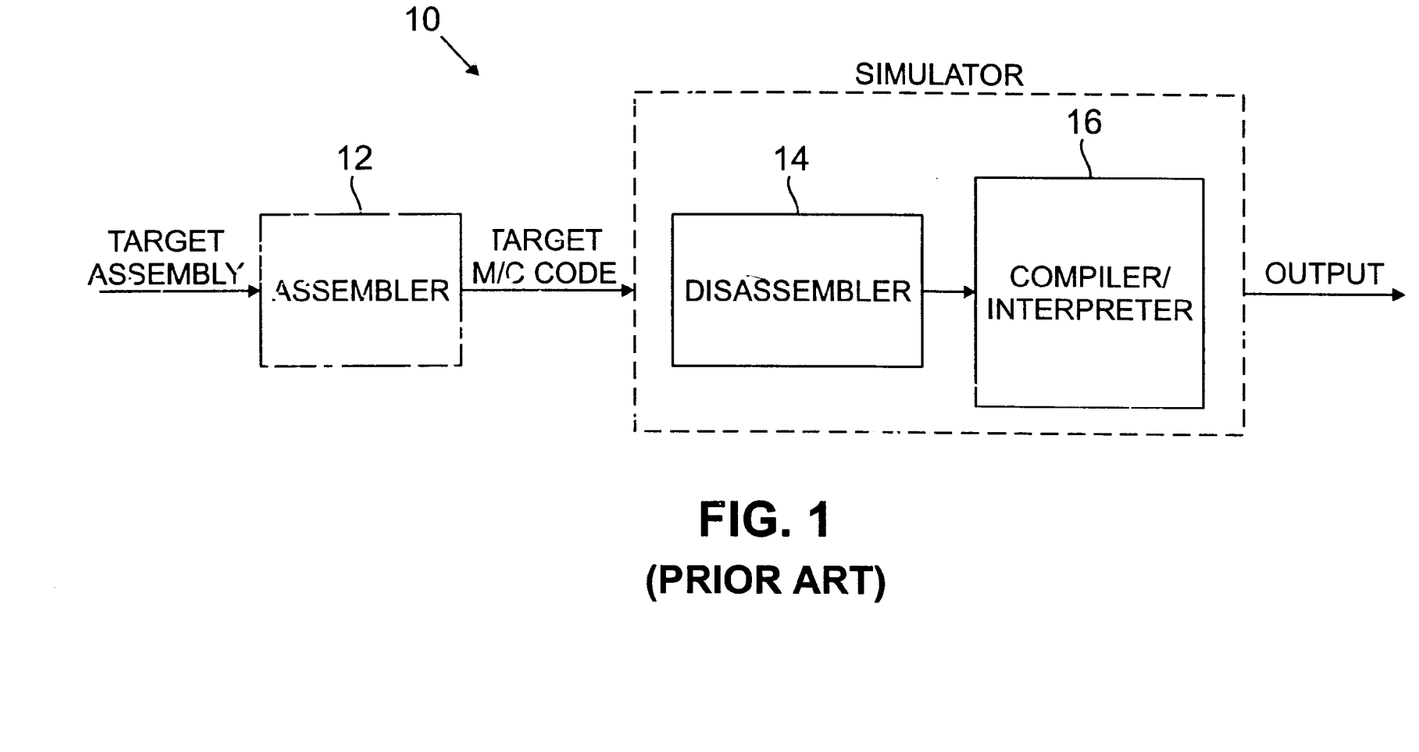
FIG. 1 is a block diagram of a conventional simulation system.

Referring to FIG. 1, a block diagram illustrating a conventional simulation system for simulating an assembly language target program is shown. The conventional simulation system 10 includes an assembler 12, a disassembler 14 and a compiler/interpreter 16 (14 and 16 forming the simulator itself). The compiler/interpreter 16 may employ one of the three above simulation techniques. As is evident, in order for the system 10 to be able to simulate an assembly language program, the program is first assembled by assembler 12 to generate the target machine code. This requires that the simulator, itself, include a disassembler 14 to disassemble the target machine code prior to submitting it to the compiler/interpreter 16, which then outputs the simulation results. The reason that the code used in the conventional approaches must be assembled is to generate machine code for execution by the simulator. The code must then be disassembled so that the target program may be viewed in accordance with the simulator. However, since the requirements of an instruction level simulator are, for example, to check whether the program is functionally correct and to collect run-time statistics about the target program, the task of assembling and then disassembling the user program appears to be unnecessary. Moreover, the time taken for assembling and disassembling is significant, particulary in a CISC processor in which instructions are usually very complicated. As a result, simulation is disadvantageously slowed down.

Lastly, another technique has been proposed in V. Zivojnovic et al., "Compiled Simulation of Programmable DSP Architectures," IEEE Workshop on VLSI Signal Processing (1995), where a machine language program is translated into a 'C' language program. Then, the compiled 'C' program is executed on the host machine. However, one of many disadvantages to this technique is that, like the other conventional approaches described above, there is still a need for tools, such as assemblers and linkers, for the processor being simulated.

SUMMARY OF THE INVENTION

In one aspect of the present invention, a technique for simulating a first processor (e.g., target processor) on a second processor (e.g., host processor) includes translating assembly language instructions associated with the first processor into 'C' language code. The 'C' language code is then compiled by a compiler program running on the second processor. The compiled code is then executed by the second processor which collects some metrics about the behavior of the first processor. That is, for example, the code may be executed to determine whether it is functionally correct and/or to collect run-time statistics regarding the program associated with the first processor.

It is to be appreciated that simulation apparatus and methodology of the present invention provide many advantages over conventional approaches. For instance, the simulation approach of the invention is easily supported on multiple host processors since the intermediate code that is generated is in 'C' language and most available general purpose development platforms have their own 'C' compilers (i.e., native compiler). Also, the simulation approach of the invention provides efficiencies since the approach can make use of optimizations provided in the native 'C' compilers of the host processors to produce code that is optimized for running on the host platform. The overhead associated with assembling and disassembling the assembly programs associated with the target processor, as is done in conventional simulation systems, is eliminated. Further, existing tools associated with the host processor can be used to debug and profile programs of the target processor, thus, eliminating development costs associated with the development of new target processor-specific tools. Still further, the speed of simulation according to the invention is increased due to, for example, the use of optimization, as compared to conventional interpreted approach as well as the traditional compiled approach.

Advantageously, since the present invention provides for separate compilation of assembly programs, assembly and link time of unchanged parts of the program is saved. This is beneficial, particularly, with respect to relatively large target applications programs. Also, it is to be appreciated that a simulation approach that works on the completely linked image of the program is disadvantageous in that the source level information is typically lost which makes certain kinds of optimizations difficult to apply. More specifically, problems with jump tables that are generated by the compiler can be more easily detected at the assembly level than at the machine code level.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

It is to be appreciated that the term "processor" as used herein is intended to include any processing device, including a CPU (central processing unit) and associated memory. The term "memory" as used herein is intended to include memory associated with a processor or CPU, such as RAM, ROM, or even a fixed memory device (e.g., hard drive) or a removable memory device (e.g., diskette). In addition, the processing device may include one or more input devices, e.g., keyboard, for inputting data to the processing unit, as well as one or more output devices, e.g., CRT display and/or printer, for providing results associated with the processing unit. It is also to be understood that various elements associated with a processor may be shared by other processors. Accordingly, software instructions or code for performing the methodologies of the invention, described herein, may be stored in one or more of the associated memory devices (ROM, fixed or removable memory) and, when ready to be utilized, loaded into RAM and executed by a CPU. Accordingly, consistent with the terminology mentioned above, the term "target processor" or "target machine," which is the processor to be simulated (e.g., a DSP), includes one or more processing devices and associated memory. Likewise, the "host processor" or "host machine," which is the processor on which the simulator runs on, includes one or more processing devices and associated memory. As will be explained, the "translator" of the invention may include one or more dedicated processing devices and associated memory or may be executed by the one or more processing devices and associated memory of a host machine.

Figure 2A:
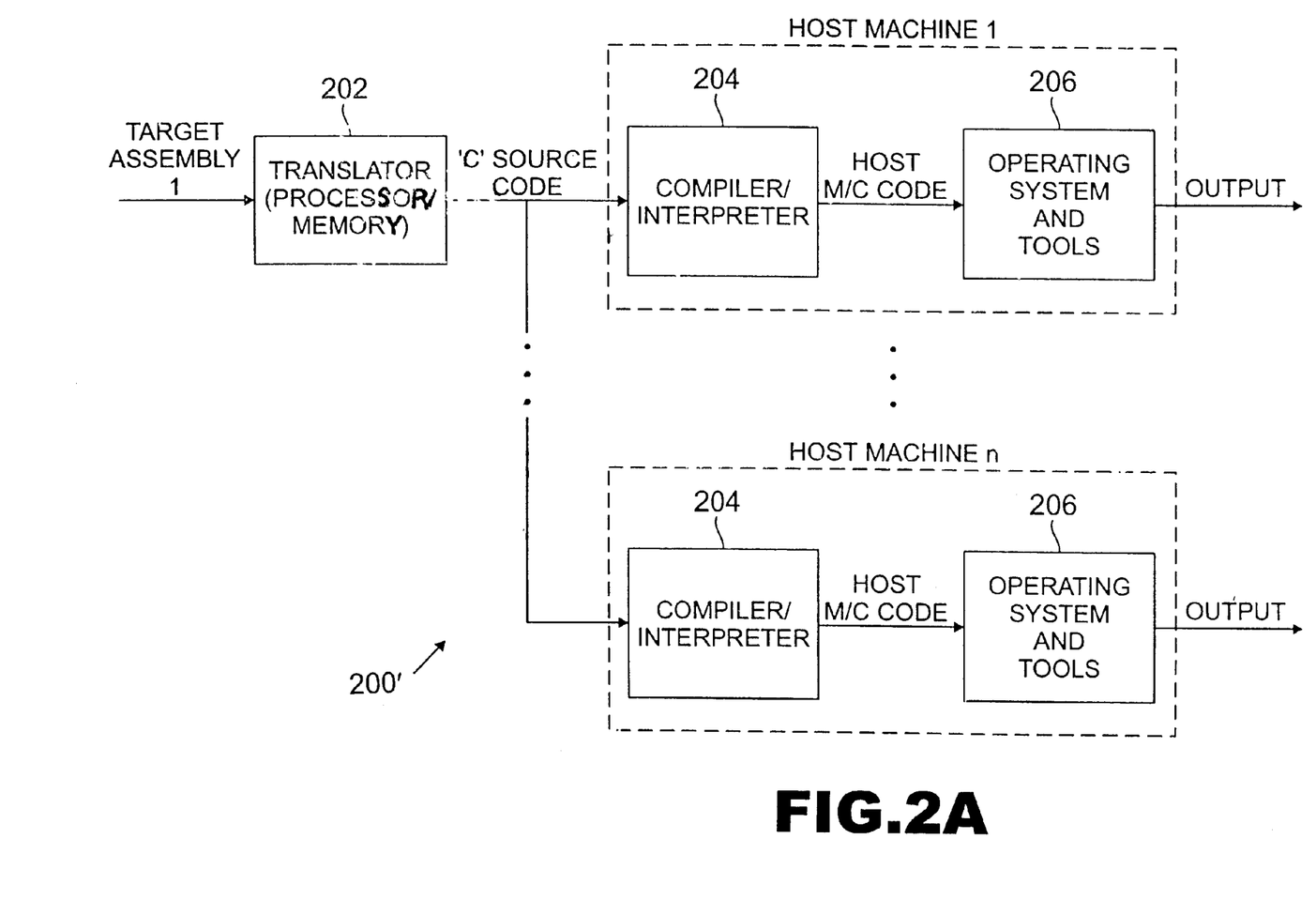
FIG. 2A is a block diagram of a simulation system according to an embodiment of the invention.

Referring now to FIG. 2A, a block diagram of an instruction level simulation system 200 according to an embodiment of the invention is shown. The system 200 includes a translator 202 operatively coupled to a plurality of host machines 1 through n. Each host machine includes its own native compiler/interpreter 204 and operating system 206. A target assembly language program, specific to the target processor being simulated, is provided to translator 202. The translator 202 translates the assembly language program to 'C' language source code, as will be explained below in the context of FIGS. 4A through 4G. Advantageously, the 'C' source code is then compiled (interpreted) by the native compiler (interpreter) running on each host machine 1 through n. Also, advantageously, the code may be optimized through available optimizations in the native 'C' compiler of each host machine. The host machine-compiled code is then analyzed in accordance with the operating system 206 of each host machine to check whether the program is functionally correct and to collect run-time statistics about the target program. The analysis process may be accomplished as is known in the art and is not critical to the invention. Also, various tools associated with the native compiler may be employed by a user of the simulation system, e.g., debugging and profiling programs.

It is to be appreciated that the compiler/interpreter 204 and operating system 206 on each host machine are executed by the processor and memory associated with each machine. Also, the translator 202 with its associated methodologies may be executed on its own dedicated machine, including a processor and memory, or on one of the host machines.

Figure 3A:
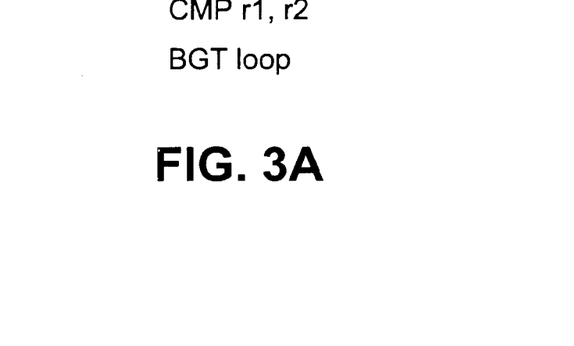
FIG. 3A is an example of an assembly language instruction sequence.
Figure 3B:
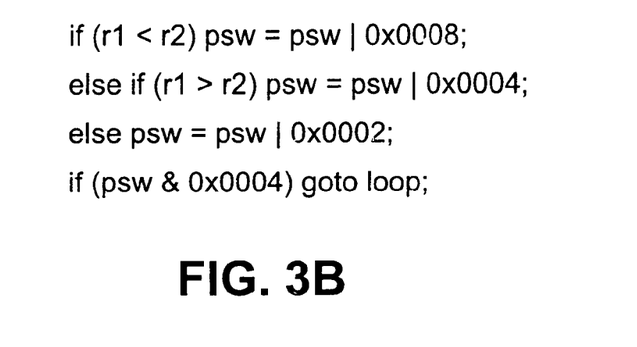
FIG. 3B is an example of a 'C' language translation of the instruction sequence in FIG. 3A.
Figure 3C:
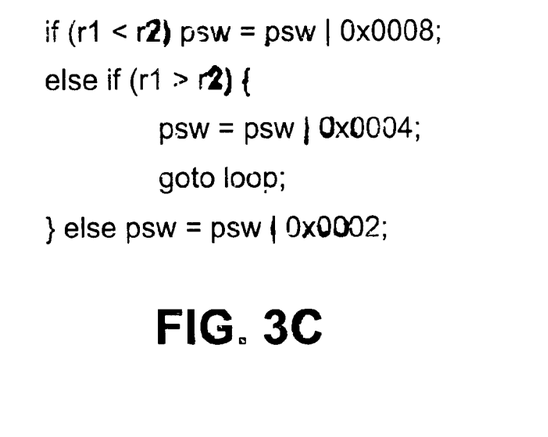
FIG. 3C is an example of a 'C' language optimized translation of the instruction sequence in FIG. 3A.

By way of example, an assembly language instruction sequence such as shown in FIG. 3A, where CMP is "Compare" and BGT is "Branch on Greater Than," provided to translator 202, is translated to 'C' language code as shown in FIG. 3B. In fact, an optimizing 'C' compiler can optimize the program in FIG. 3B to produce the code shown in FIG. 3C. It is to be appreciated that r1, r2, and psw are part of the processor state. The terminology "processor state" or "state of the processor" refers to the state of the target processor. This comes from the fact that instruction level simulators, such as interpretive simulators, process instructions by using a software model of the target processor. Thus, a virtual processor is constructed using a data structure representing the state of the processor and a program which changes the processor state according to stimuli, e.g., a new instruction or some external event such as an interrupt.

Figure 2B:
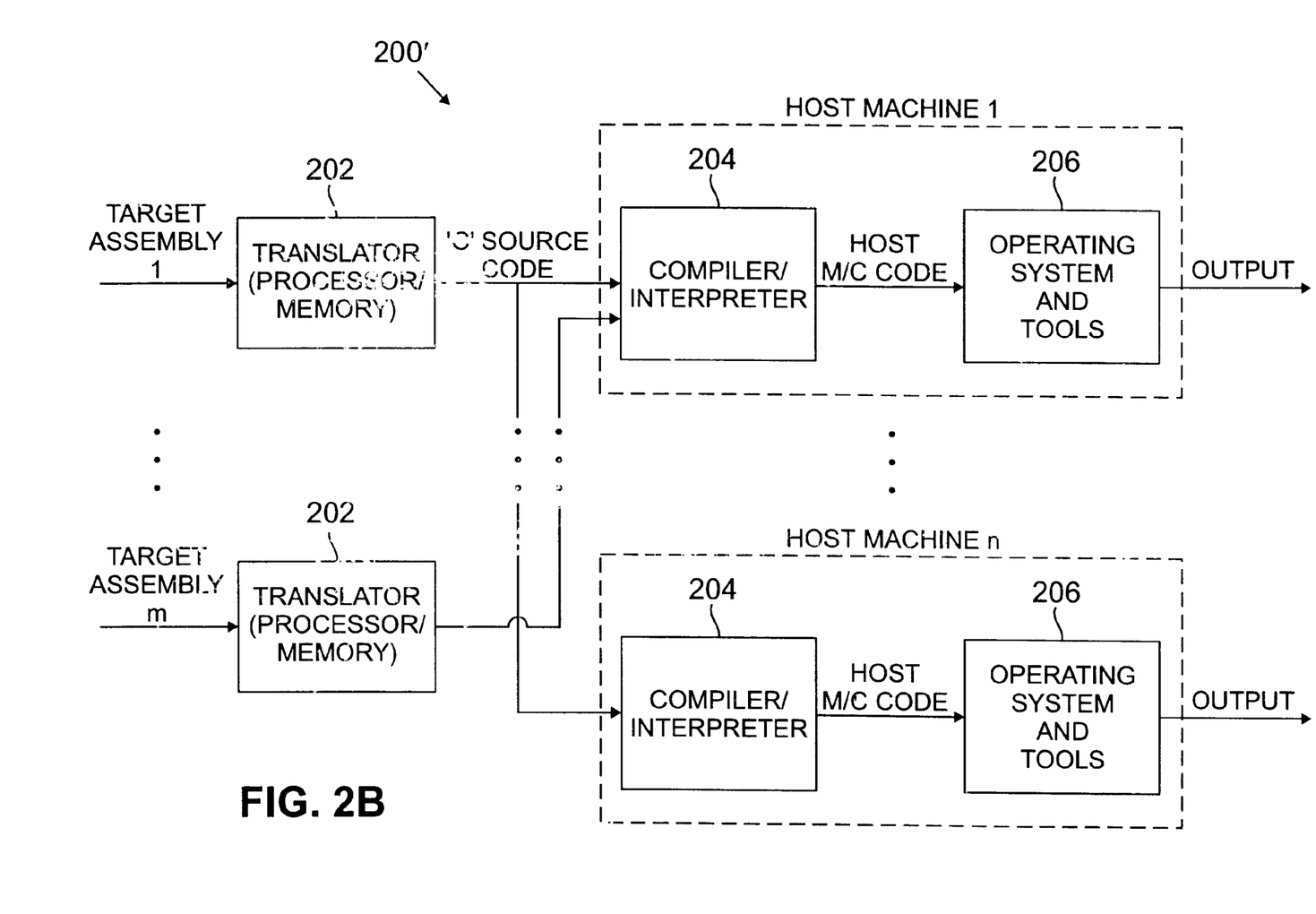
FIG. 2B is a block diagram of a simulation system according to another embodiment of the invention.

Advantageously, the simulation system 200 of the invention provides a solution to the "m×n" problem, explained above, in that the problem of producing simulators for "m" target processors on "n" host machines is eliminated by simply employing "m" translators. That is, if host machine 1 is to be used to simulate two different target processors, then, two translators are employed, each providing translated code respectively associated with one of the target processors to the host machine 1. FIG. 2B illustrates the arrangement where "m" translators provide translated code associated with "m" target processors to host machine 1. However, as explained, other "m×n" arrangements are possible.

The following is a description of an embodiment of a methodology for translating assembly language instruction sequences into 'C' language code, via translator 202, according to the invention. It is to be noted that, until the present invention described herein, translation of assembly programs into 'C' posed significant problems. Considerable study has been done translating 'C' to assembly but, until the present invention, not in the opposite direction. Since there is no restriction on the way in which an assembly program is written, the task of translating an arbitrary assembly program into a 'C' program is not trivial.

All target assembly code present in a file must be enclosed in a function since, in 'C', all code must be part of the function. This creates some problems which must be solved by appropriate encodings that conform to 'C' linkage conventions in the case when files are to be compiled separately and linked along with the export and import directives.

A export directive of an assembly program exports a label that is defined in the program for use by the assembly code in other assembly source files which in turn import this label through a import directive. But, in 'C', one can not jump to an arbitrary label defined in another function. Moreover, labels in 'C' do not have external linkage (visibility across other files) and therefore they must be simulated through functions that can have external linkages.

Figure 4A:
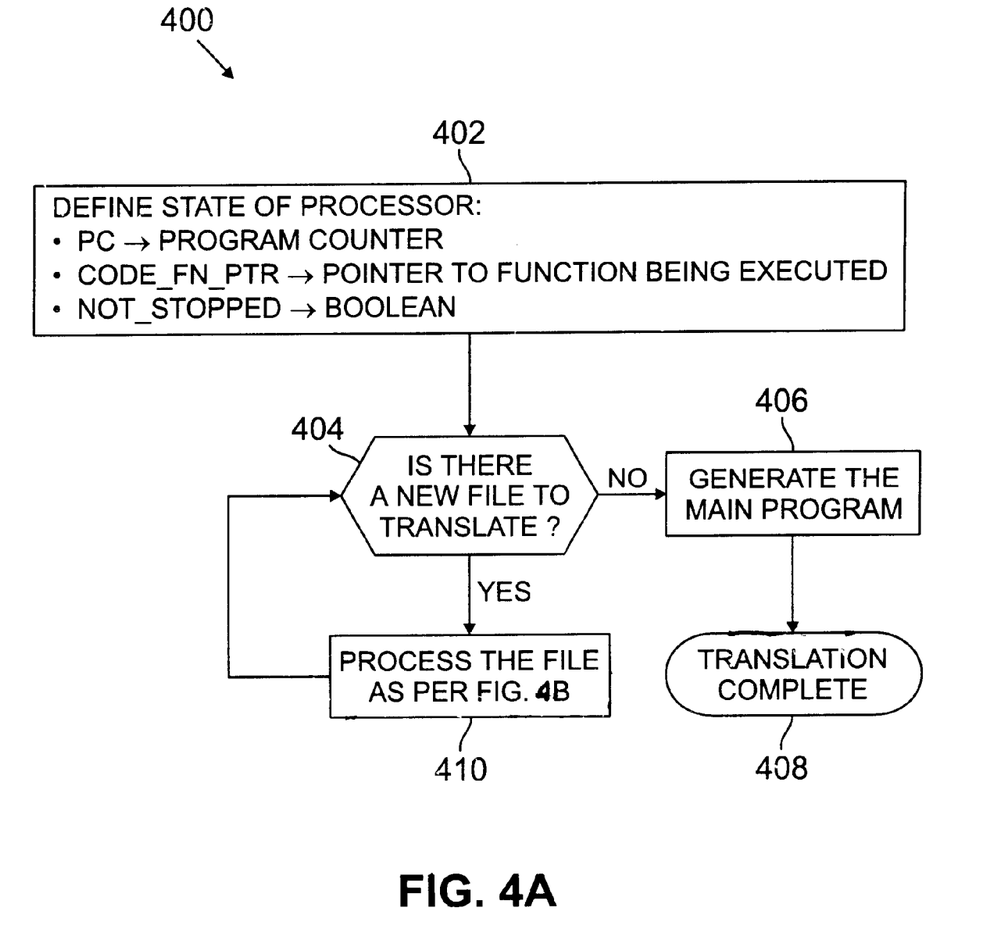
FIGS. 4A through 4G are flow charts of an embodiment of a translation method according to the invention.

Referring now to FIGS. 4A through 4G, an embodiment of a method for translating an assembly language program to a 'C' language program according to the invention is shown. It is to be appreciated that some of the steps in the sequence of steps in the translation method, to be explained below, may be performed in a different order than described. Referring initially to FIG. 4A, the state of the processor is defined as a set of global variables, in step 402. The global variables are pc, code_fn_ptr, and not_stopped. The global variable pc refers to the value of a program counter associated with the assembly language program. This is typically present in the state of the processor. The global variable code_fn_ptr is a pointer to the function which can have one of the <filename>_code (i.e., output filenames) functions as its value. The global variable not_stopped is a boolean that is false at the start of the translation process and is set to true when an instruction that stops the processor (translator) is executed.

It is assumed that the address map (where the program is loaded into memory of the translator) is known at the beginning of the translation process. For instance, the address map may be provided by the user of the translator.

Every exported label has a corresponding function in a particular file. It is to be appreciated that a program to be translated may be made up of one or more files. This function sets the code_fa_ptr to the code function of the current file and the pc to the value corresponding to the label. This allows another part of the program, defined in a different file, access to the label by a call to the function.

Returning to FIG. 4A, given the definition of the global variables, the translator determines whether there is a new file to be translated, in step 404. If there is a new file to translate, the file is processed in step 410, according to the invention, in the following manner.

Figure 4B:
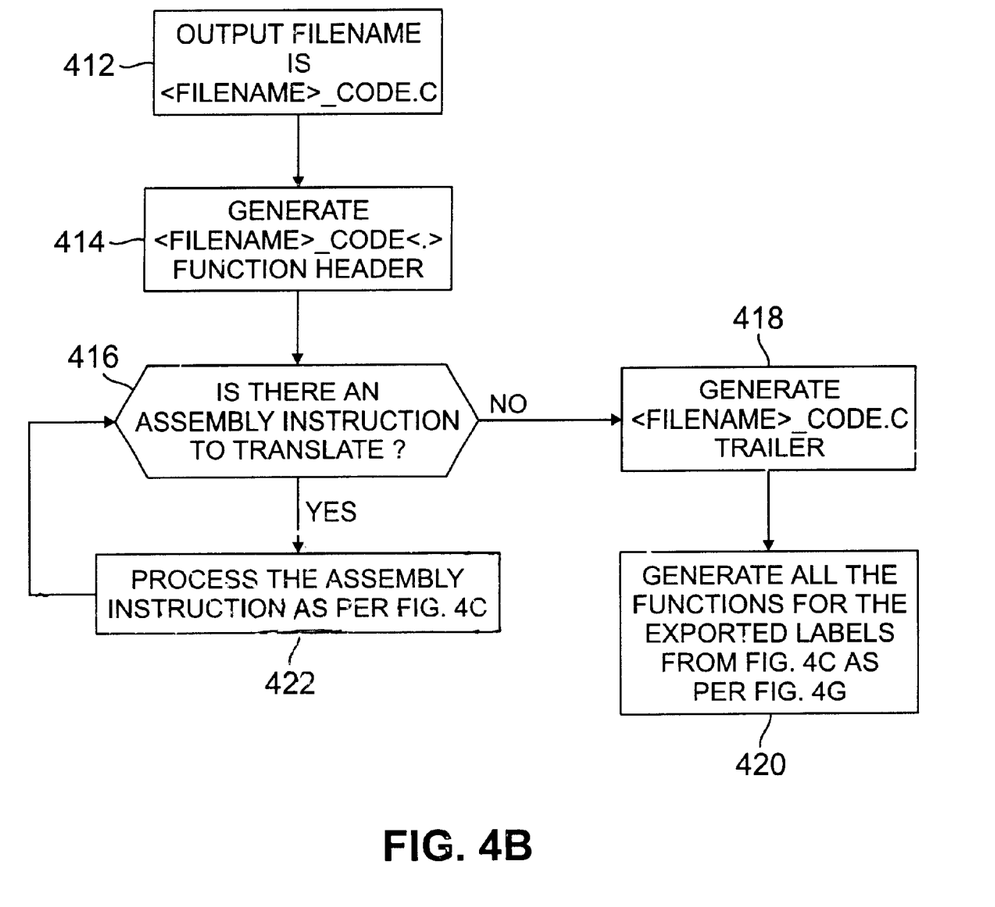

Referring to FIG. 4B, the file to be translated is processed as follows. First, an output filename is represented as <filename>_code.c (step 412). A function header is then generated for <filename>_code( ) (step 414). Then, in step 416, the translator determines whether there is an assembly instruction to be translated. If there is an assembly instruction to be translated, in step 422, the assembly instruction is processed according to the steps in FIG. 4C.

Figure 4C:
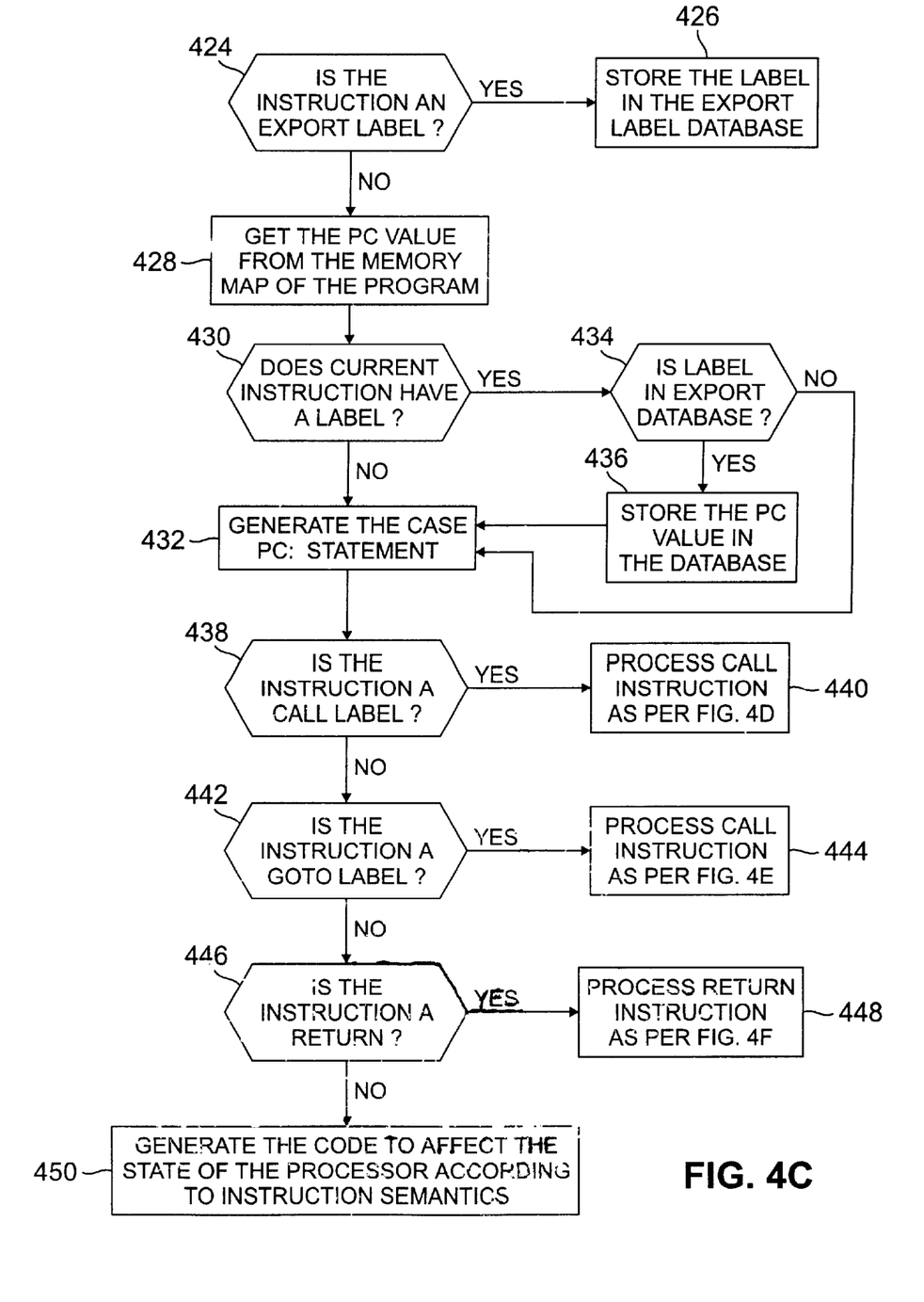

Referring now to FIG. 4C, in step 424, the translator determines whether the instruction is an export label. If yes, then the export label is stored in an export label database (the database may be part of the memory associated with the translator), in step 426. If not an export label, in step 428, the pc value from the memory map is retrieved (also from the translator memory). In step 430, the translator determines whether the current instruction has a label. If not, in step 432, a case pc: statement is generated. If the instruction does have a label, then, in step 434, the translator determines whether the label is in the export database. If not, the case pc: statement is generated. If the label is in the export database, the pc value of the label is stored in the export database (step 436) and, then, the case pc: statement is generated.

Next, the translator determines the nature of the instruction, that is, whether the instruction is a call label, a goto label, or a return. Thus, in step 438, it is determined whether the instruction is a call label. If yes, the call label is processed in step 440 in manner to be explained in the context of FIG. 4D. If the instruction is not a call label, in step 442, it is determined whether the instruction is a goto label. If yes, the goto label is processed in step 444 in manner to be explained in the context of FIG. 4E. If the instruction is not a goto label, in step 446, it is determined whether the instruction is a return. If yes, the return instruction is processed in step 448 in manner to be explained in the context of FIG. 4F. If the instruction is not a return, in step 450, the translator generates the code to affect the state of the processor according to instruction semantics. As is known, instruction semantics are operations on state variables that represent the state of the processor.

Figure 4D:
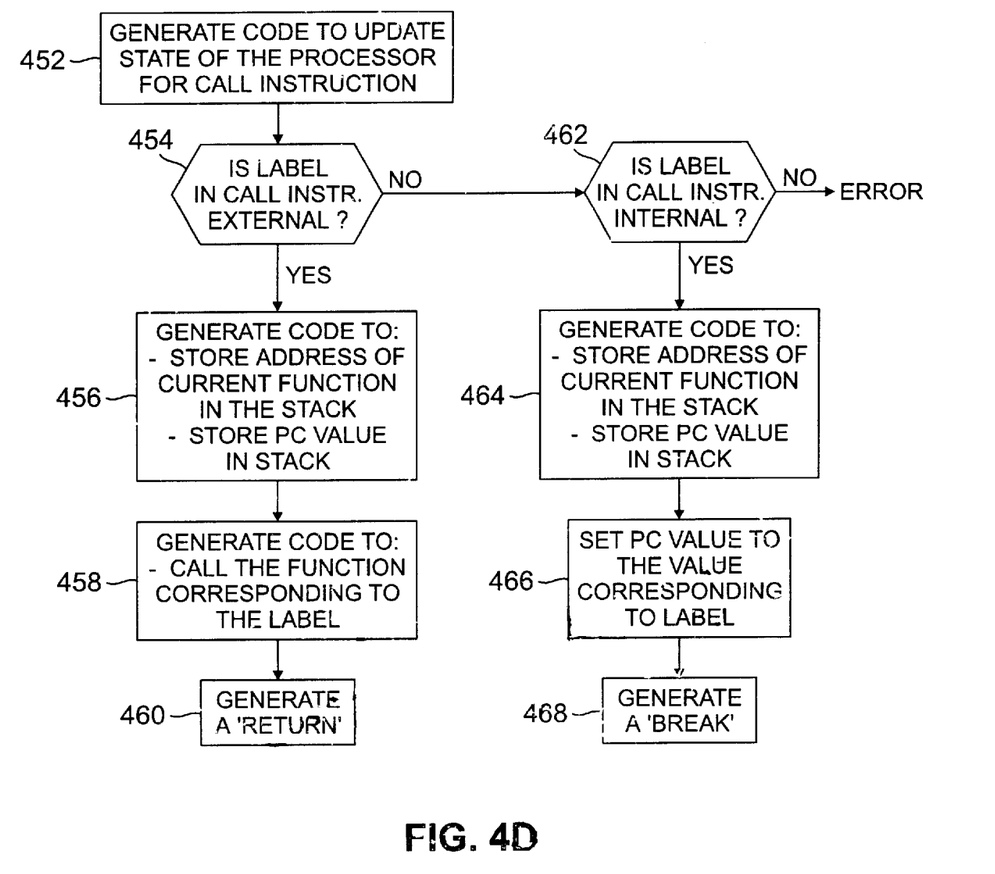

Referring now to FIG. 4D, a method of processing a call instruction is shown. In step 452, the translator generates the code to update the state of the processor for the call instruction. Then, it is determined whether the call instruction is external (to the assembly program), in step 454. If external, in step 456, the translator generates code to store the address of the current function in a stack and stores the pc value in the stack. It is to be understood that the return address is the address of the function corresponding to the current file and the address to which it must return. Both of these addresses have to be stored in the run-time stack of the translation processor. Then, in step 458, it generates code to call the function corresponding to the label. Then, the translator generates a return, in step 460. However, if the call instruction label is not external, the translator determines whether it is internal (to the current assembly program file), in step 462. If not internal or external, the translator generates an error message to the user. If the call instruction label is internal, then, in step 464, the translator generates code to store the address of the current function in a stack and stores the pc value in the stack. Again, it is to be understood that the return address is the address of the function corresponding to the current file and the address to which it must return. Both of these addresses have to be stored in the run-time stack of the translation processor. Then, in step 466, it sets pc value to the value corresponding to the label. In step 468, the translator then generates a break.

Figure 4E:
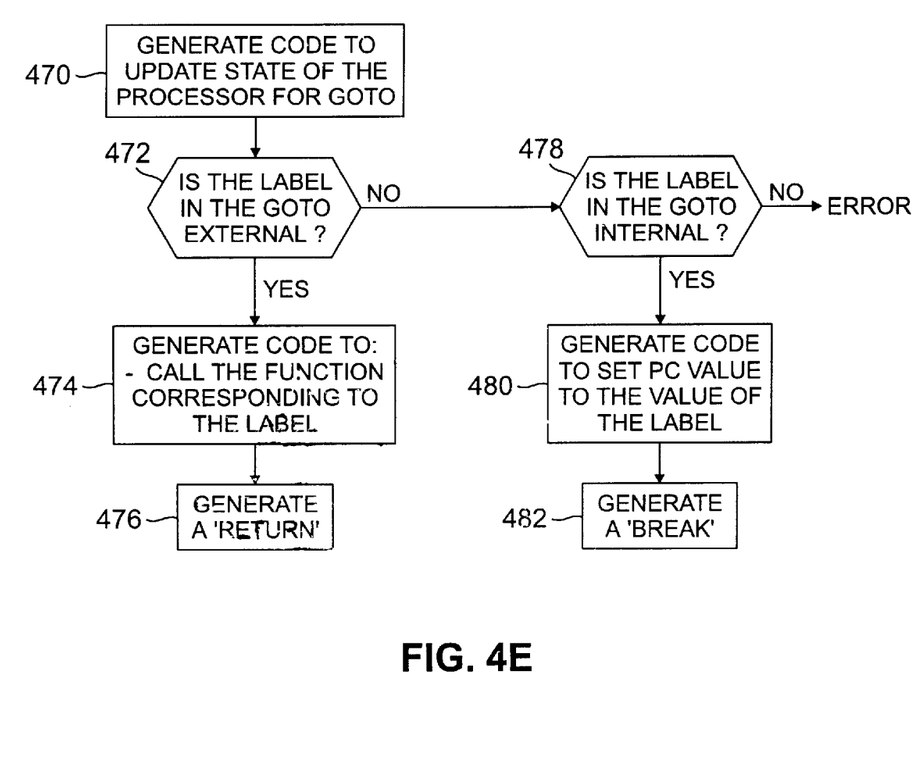

Referring now to FIG. 4E, a method of processing a goto instruction is shown. In step 470, the translator generates the code to update the state of the processor for the goto instruction. Then, it is determined whether the label in the goto instruction is external, in step 472. If external, in step 474, the translator generates code to call the function corresponding to the label. Then, the translator generates a return, in step 476. However, if the label in the goto instruction is not external, the translator determines whether it is internal (step 478). If not internal or external, the translator generates an error message to the user. If the label in the goto instruction is internal, then, in step 480, the translator generates code to set pc value to the value corresponding to the label. In step 482, the translator then generates a break.

Figure 4F:
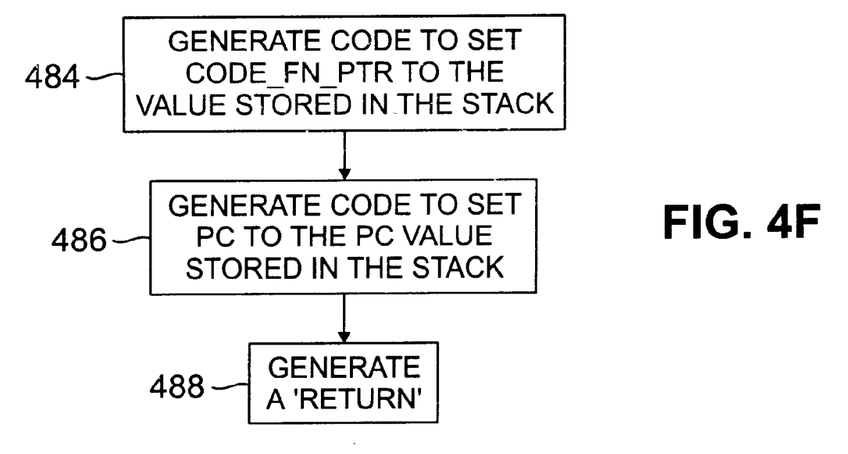

Referring now to FIG. 4F, a method of processing a return instruction is shown. In step 484, the translator generates code to set code__fn__ptr to the value stored in the stack (i.e., return address register). Then, in step 486, the translator generates code to set pc to the pc value stored in the stack. The translator then generates a return, in step 488.

Returning now to step 416 of FIG. 4B, the translation method 200 determines whether there is another assembly instruction to translate. If so, step 422 (invoking the processes of FIGS. 4C, 4D, 4E, and 4F) is repeated for each subsequent instruction. If not, then a trailer is generated for <filename>__code.c, in step 418. Then, in step 420, functions for exported labels generated in accordance with the steps of FIG. 4C are generated in accordance with the steps in FIG. 4G as follows.

Figure 4G:
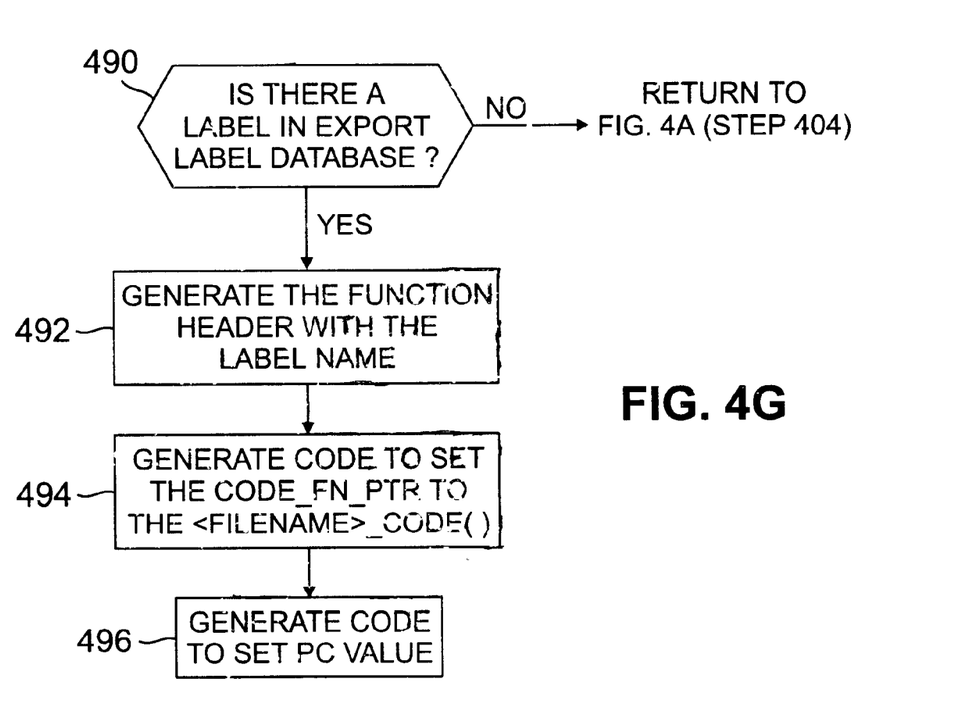

Referring to FIG. 4G, the translator determines if there is a label in the export label database. If no, then the translation method returns to step 404 of FIG. 4A, as explained below. However, if a label is in the export label database, the translator generates the function header with the label name, in step 492. Then, in step 494, it generates code to set the code fn__ptr to <filename>__code(). Next, the translator generates code to set the pc value of the label, in step 496. The process then returns to step 490 and repeats for every other label in the export label database.

Once all instructions are processed in the current file, the method 400 returns to step 404 of FIG. 4A where the translator determines if there is any new file to be processed as explained above. If yes, then step 410 (invoking the processes of FIGS. 4B, 4C, 4D, 4E, and 4F) is repeated for each subsequent file. However, if no new file is to be processed, in step 406, the main program (that is, the 'C' translation of the assembly program) is generated and translation is complete (block 408).

Figure 5:
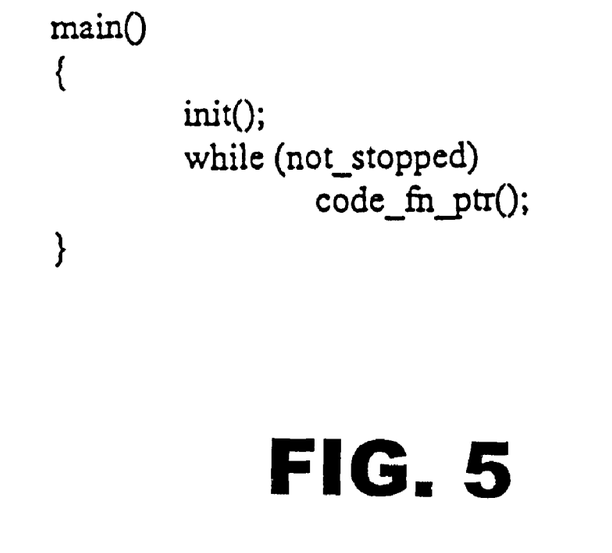
FIG. 5 is an example of a main translation program according to an embodiment of the invention.

An example of a main program generated according to the invention is shown in FIG. 5. It is to be appreciated that the init() function is generated in the file which contains the starting address of the assembly program and it sets the code__fn__ptr to the address of the function containing the starting pc value and also the pc to the starting value.

Figure 6A:
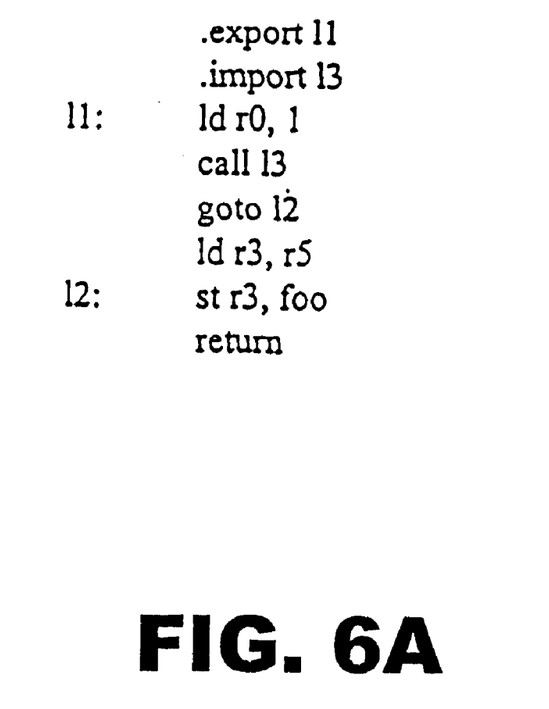
FIG. 6A is an example of assembly language code.
Figure 6B:
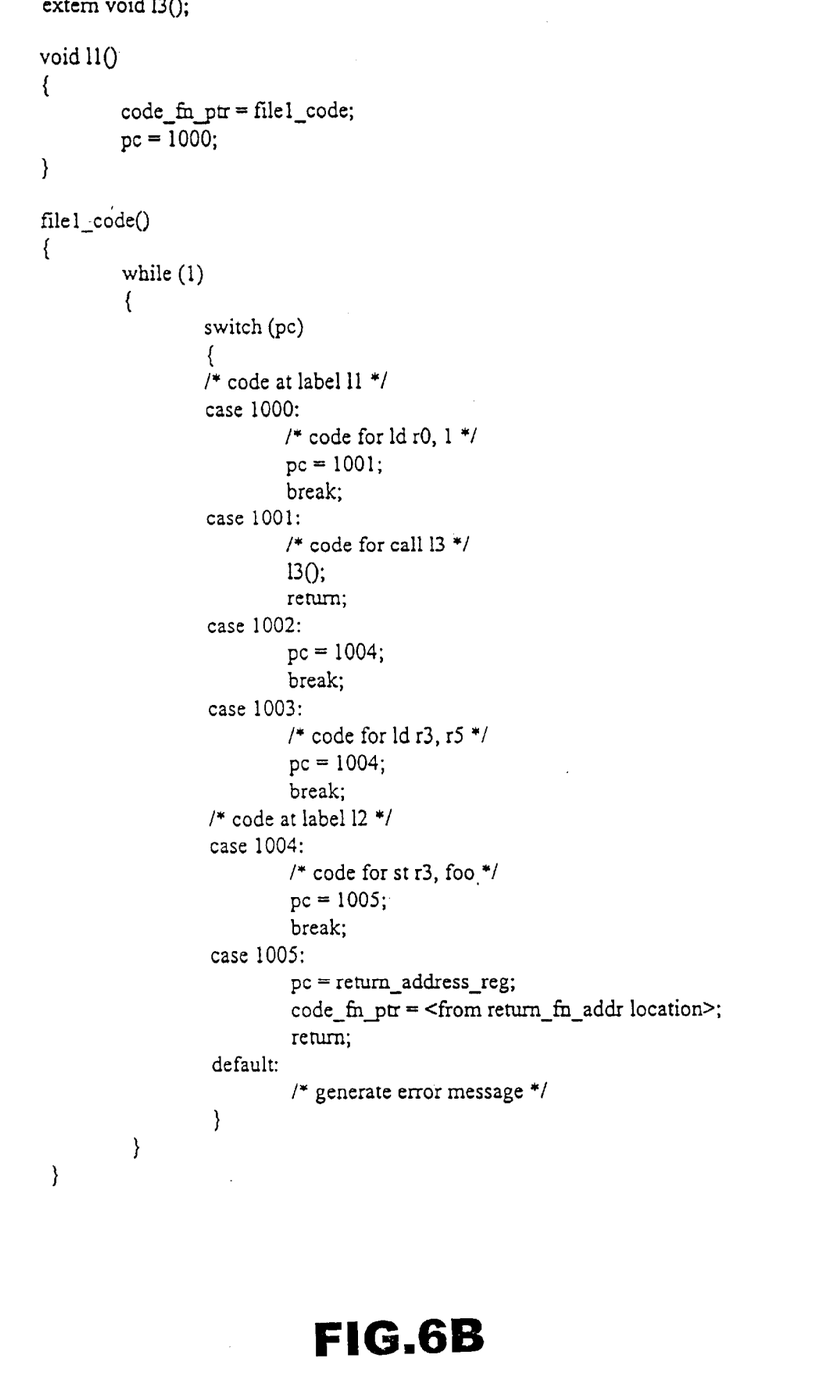
FIG. 6B is an example of a 'C' language translation of the assembly language code in FIG. 6A.

Referring now to FIG. 6A, an example of an assembly language program file (file1.asm) is shown. This file is provided to the translator 202 (FIG. 2A) and, in accordance with the translation methodology 400 (FIGS. 4A through 4G), the translator generates the 'C' language program shown in FIG. 6B. It is to be understood that the function extern void() in FIG. 6B is generated by the steps discussed above with respect to FIG. 4G. Further, the individual case statements in the function file1__code() of the program are respectively generated by the steps in FIGS. 4B through 4F. For instance, case statement 1001 is generated by the steps of FIG. 4D; case statement 1002 is generated by the steps of FIG. 4E; case statement 1005 is generated by the steps of FIG. 4F. It is to be appreciated that the other case statements are generated from the semantics of the assembly instructions (i.e., instruction semantics).

It is to be appreciated that the state of the processor is preferably defined as global variables in 'C' with appropriately meaningful names, e.g., register 0 referred to as r0 in the target processor is defined as a global variable named r0. This is so that a native debugger program running on the host machine can be used to run the target program and examine the state of the processor. Also, in order to make other commands like break points and stepping work, the debug information in the host machine code is changed to reflect the fact that the source is 'source assembly' and not the generated 'C' code. This can be easily achieved by generating the #line directives as done in many of the program generation systems such as, for example, lex, yacc. The ability to use the native host machine tools, for example, the debugger, is one of the significant advantages associated with the invention. Also, simulation according to the invention is faster than conventional simulation approaches since the invention uses the host processor's hardware as opposed to instruction by instruction simulation and checking for break conditions as found in many conventional instruction level simulators.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of simulating at least a first processor having an assembly language instruction set associated therewith on a second processor having a 'C' language compiler associated therewith, the method comprising the steps of:

translating a sequence of assembly language instructions associated with the at least a first processor into the 'C' language to generate a 'C' language code representative of the sequence of assembly language instructions, wherein the 'C' language code may include one or more functions which include an external linkage for representing an export label associated with the sequence of assembly language instructions;

compiling the 'C' language code on the compiler associated with the second processor; and executing a compiled code to determine a performance thereof.

2. The method of claim 1, wherein the translating step further comprises the step of enclosing the assembly language instructions in one or more 'C' language functions.

3. The method of claim 1, wherein the translating step further comprises the step of defining a state of the first processor, the state of the first processor being represented by one or more variables.

4. The method of claim 3, wherein a first variable is a program counter (pc) value associated with the assembly language sequence.

5. The method of claim 4, wherein a second variable is a pointer to a function associated with the 'C' language code.

6. The method of claim 5, wherein a third variable is a boolean which is at a first state at the start of the translating step and is at a second state when an instruction that stops the translating step is encountered.

7. The method of claim 6, wherein the translating step further comprises the steps of:

processing the current sequence of assembly language instructions;

determining whether there is a new sequence to be processed;

generating a main program which includes the 'C' language code representative of the translated assembly language sequence, when there is no new sequence to translate; and repeating the sequence processing step, when there is a new sequence to be processed.

8. The method of claim 7, wherein the sequence processing step further comprises the steps of:

assigning a filename to the current sequence of instructions;

generating a function header associated with a function;

processing a current assembly instruction in the current sequence;

determining whether there is a new assembly instruction to be processed;

generating a function trailer associated with the function, when there is no new assembly instruction to be processed; and repeating the instruction processing step, when there is a new instruction to be processed.

9. The method of claim 8, wherein the instruction processing step further comprises the steps of:

determining whether the instruction is an export label;

storing the export label in an export label database, when the instruction is an export label; and retrieving the pc value associated with the instruction, when the instruction is not an export label.

10. The method of claim 9, further comprising the steps of:

determining whether the current instruction has a label;

determining whether the label is in the export label database when the current instruction has a label, and storing the pc value in the database when the label is in the database; and generating a case pc statement, when the current instruction does not have a label, there is a label and the label is not in the export database, or there is a label in the database and the pc value has been stored.

11. The method of claim 10, further comprising the steps of determining a nature of the current instruction and processing instruction in accordance therewith.

12. The method of claim 11, wherein the current instruction includes a call label and the call instruction label processing step further comprises the steps of:

generating code to update the state of the processor for the call instruction;

determining whether the label in the call instruction is external or internal to the current assembly language instruction sequence;

when the label is external:
generating code to store an address of the current function in a stack and storing the pc value in the stack;
generating code to call a function corresponding to the label;
generating a return; and when the label is internal:
generating code to store an address of the current function in a stack and storing the pc value in the stack;
setting the pc value to a value corresponding to the label;
generating a break.

13. The method of claim 12, wherein an error message is generated when the label is not internal or external.

14. The method of claim 11, wherein the current instruction includes a goto label and the goto instruction label processing step further comprises the steps of:

generating code to update the state of the processor for the goto instruction;
determining whether the label in the goto instruction is external or internal to the current assembly language instruction sequence;
when the label is external:
  generating code to call a function corresponding to the label;
  generating a return; and
when the label is internal:
  generating code to set the pc value to a value corresponding to the label;
  generating a break.

15. The method of claim 14, wherein an error message is generated when the label is not internal or external.

16. The method of claim 11, wherein the current instruction is a return and the return instruction processing step further comprises the steps of:
  generating code to set the function pointer variable to the value stored in the stack;
  generating code to set the program counter to the pc value stored in the stack; and
  generating a return.

17. The method of claim 8, wherein the sequence processing step further comprises the step of generating functions for export labels.

18. The method of claim 17, wherein the export label generating step further comprises the steps of:
  determining whether a label is stored in an export label database;
  generating the function header with a name of the label, when there is a label stored therein;
  generating code to set the function pointer variable to the function, when there is a label stored therein; and
  generating code to set the pc value, when there is a label stored therein.

19. An article of manufacture comprising a machine readable medium containing one or more programs which when executed implement the steps of:
  translating a sequence of assembly language instructions associated with at least a first processor into a 'C' language to generate a 'C' language code representative of the sequence of assembly language instructions, wherein the 'C' language code may include one or more functions which include an external linkage for representing an export label associated with the sequence of assembly language instructions;
  compiling the 'C' language code; and
  executing the compiled code to determine a performance thereof.

20. Apparatus for simulating at least a fast processor having an assembly language instruction set associated therewith, the apparatus comprising:
  at least one processor for translating a sequence of assembly language instructions associated with the at least a first processor into a 'C' language to generate a 'C' language code representative of the sequence of assembly language instructions, wherein the 'C' language code may include one or more functions which include an external linkage for representing an export label associated with the sequence of assembly language instructions, compiling the 'C' language code, and executing the compiled code to determine a performance thereof; and
  memory for storing one or more of the sequence of assembly language instructions, the 'C' language code, the compiled code, and results associated with the executed code.

21. The apparatus of claim 20, wherein the processor performs translation by enclosing the assembly language instructions in one or more 'C' language functions.

22. The apparatus of claim 20, wherein the processor performs translation by defining a state of the first processor, the state of the first processor being represented by one or more variables.

23. The apparatus of claim 22, wherein a first variable is a program counter (pc) value associated with the assembly language sequence.

24. The apparatus of claim 23, wherein a second variable is a pointer to a function associated with the 'C' language code.

25. The apparatus of claim 24, wherein a third variable is a boolean which is at a first state at the start of the translating step and is at a second state when an instruction that stops the translating step is encountered.

26. The apparatus of claim 25, wherein the processor performs translation by processing the current sequence of assembly language instructions, determining whether there is a new sequence to be processed, generating a main program which includes the 'C' language code representative of the translated assembly language sequence, when there is no new sequence to translate, and repeating the sequence processing step, when there is a new sequence to be processed.

27. The apparatus of claim 26, wherein the processor performs sequence processing by assigning a filename to the current sequence of instructions, generating a function header associated with a function, processing a current assembly instruction in the current sequence, determining whether there is a new assembly instruction to be processed, generating a function trailer associated with the function, when there is no new assembly instruction to be processed, and repeating the instruction processing step, when there is a new instruction to be processed.

28. The apparatus of claim 27, wherein the processor performs instruction processing by determining whether the instruction is an export label, storing the export label in an export label database, when the instruction is an export label, and retrieving the pc value associated with the instruction, when the instruction is not an export label.

29. The apparatus of claim 28, wherein the processor further performs instruction processing by determining whether the current instruction has a label, determining whether the label is in the export label database when the current instruction has a label, storing the pc value in the database when the label is in the database, and generating a case pc statement, when the current instruction does not have a label, there is a label and the label is not in the export database, or there is a label in the database and the pc value has been stored.

30. The apparatus of claim 29, wherein the processor further performs instruction processing by determining a nature of the current instruction and processing the instruction in accordance therewith.

31. The apparatus of claim 30, wherein the current instruction includes a call label and the processor performs call instruction label processing by generating code to update the state of the processor for the call instruction, determining whether the label in the call instruction is external or internal to the current assembly language instruction sequence, and when the label is external, generating code to store an address of the current function in a stack and storing the pc value in the stack, generating code to call a function corresponding to the label, generating a return, and when the label is internal, generating code to store an address of the current function in a stack and storing the pc value in the stack, setting the pc value to a value corresponding to the label, generating a break.

32. The apparatus of claim 30, wherein the processor generates an error message when the label is not internal or external.

33. The apparatus of claim 30, wherein the current instruction includes a goto label and the processor performs goto instruction label processing by generating code to update the state of the processor for the goto instruction, determining whether the label in the goto instruction is external or internal to the current assembly language instruction sequence, and when the label is external, generating code to call a function corresponding to the label, generating a return, and when the label is internal, generating code to set the pc value to a value corresponding to the label, generating a break.

34. The apparatus of claim 33, wherein the processor generates an error message when the label is not internal or external.

35. The apparatus of claim 30, wherein the current instruction is a return and the processor performs return instruction processing by generating code to set the function pointer variable to the value stored in the stack, generating code to set the program counter to the pc value stored in the stack, and generating a return.

36. The apparatus of claim 27, wherein the processor further performs sequence processing by generating functions for export labels.

37. The apparatus of claim 36, wherein the processor further performs export label generation by determining whether a label is stored in an export label database, generating the function header with a name of the label, when there is a label stored therein, generating code to set the function pointer variable to the function, when there is a label stored therein, and generating code to set the pc value, when there is a label stored therein.

38. Apparatus for simulating a first plurality of target processors, each having an assembly language instruction set associated therewith, the apparatus comprising:

a first plurality of translators, each translator including at least one processor for translating a sequence of assembly language instructions associated with one of the first plurality of target processors into a 'C' language to generate a 'C' language code representative of the sequence of assembly language instructions, wherein the 'C' language code may include one or more functions which include an external linkage for representing an export label associated with the sequence of assembly language instructions; and a second plurality of compilers for compiling the 'C' language code associated with at least one of the first plurality of translators, and for executing the compiled code to determine a performance thereof.

39. The apparatus of claim 38, wherein the first plurality of translators is greater than the second plurality of compilers.

40. Apparatus for simulating at least a first processor having an assembly language instruction set associated therewith, the apparatus comprising:

means for translating a sequence of assembly language instructions associated with the at least a first processor into the 'C' language to generate a 'C' language code representative of the sequence of assembly language instructions, wherein the 'C' language code may include one or more functions which include an external linkage for representing an export label associated with the sequence of assembly language instructions;

means for compiling the 'C' language code; and means for executing the compiled code to determine a performance thereof.

* * * * *